(No Model.)

W. E. BARTLETT.
WHEEL TIRE.

No. 466,532. Patented Jan. 5, 1892.

UNITED STATES PATENT OFFICE.

WILLIAM E. BARTLETT, OF EDINBURGH, SCOTLAND.

WHEEL-TIRE.

SPECIFICATION forming part of Letters Patent No. 466,532, dated January 5, 1892.

Application filed September 26, 1891. Serial No. 406,891. (No model.)

*To all whom it may concern:*

Be it known that I, WILLIAM ERSKINE BARTLETT, of Edinburgh, Scotland, have invented a certain Improvement in Wheel-Tires, of which the following is a specification.

This improvement in its preferable form consists of an annular tube of flexible material seated in the exteriorly-grooved and convergently-flanged rim of a wheel and an annular U-shaped rubber tire embracing the convex portion of the said tube and having its edges reinforced by thickening-ribs and inserted in the undercut recesses between the inner faces of the said inclined flanges and the adjacent portions of the said tube, whereby when the said tube is inflated the said reinforced edges completely fill the said undercut recesses and are firmly compressed against the said flanges, whereby the rubber tire is permanently secured in position.

The novel feature of the invention consists in the employment of the tire with reinforcing-ribs near its edges, which ribs may or may not be integral with the tire, but by reason of the presence of which the undercut recesses, of which the convergent flanges constitute the outer walls, are completely filled and the inclosed portions of the tire are held by pneumatic pressure firmly against the inner faces of the convergent flanges.

Figure 1:
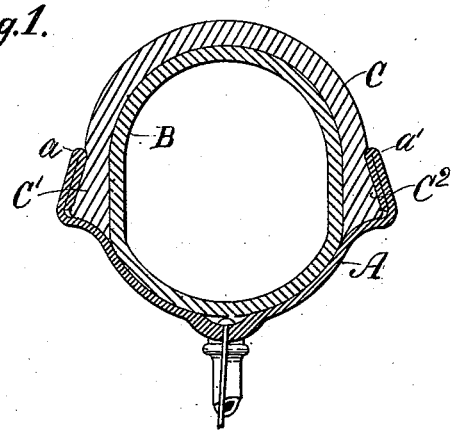
Figure 2:
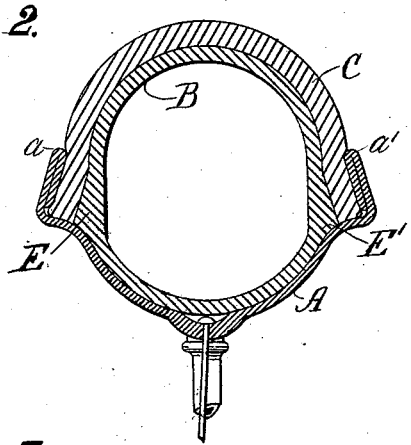
Figure 3:
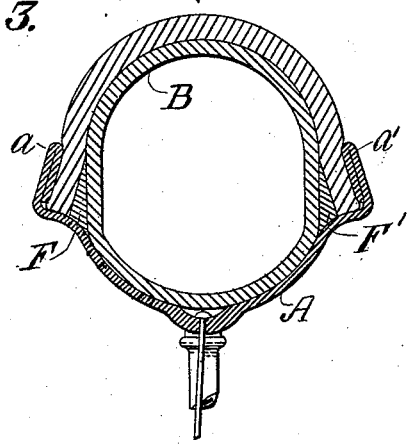

The accompanying drawings, illustrating the invention, are as follows:

Figure 1 shows the wheel-rim, the annular tube, and the embracing-tire, with integral reinforcing-ribs in cross-section in the relation which they are made to assume to each other by the inflation of the annular tube. Fig. 2 is a section similar to Fig. 1, but illustrating a modification which consists in making the reinforcing-ribs integral with the annular tube instead of being integral with the edges of the tire, as represented in Fig. 1. Fig. 3 is another similar section representing a modification which consists in the employment of independent reinforcing-ribs which are introduced between the sides of the annular tube and the edge portions of the rubber tire for the purpose of insuring the complete filling of the undercut recesses and the transmission of pressure from the inflated tube to the whole of the portions of the tire which are contained in the undercut recesses, respectively.

The wheel-rim A and the annular tube B shown in the drawings are similar to those shown and described in United States Patent to William Erskine Bartlett, dated March 24, 1891, and serially numbered 448,793.

The tire C surrounds and embraces the convex portion of the tube B, and preferably is constructed with the integral reinforcing-ribs C' and C² near its edges. The reinforced portions of the tire are, by the inflation of the tube B, compressed, respectively, against the inner faces of the convergently-inclined side flanges $a\ a'$ of the rim of the wheel. The annular tube B will usually consist of a soft-rubber tube having its ends united to each other before vulcanization. The usual means for inflating the annular tube will be employed; but as such means are well known and in common use it is not necessary to herein describe them. The inwardly-converging side flanges $a\ a'$ may be regarded as mere continuations of the side walls of the exterior groove in the wheel-rim, their purpose being to furnish undercut recesses in which the reinforced portions of the tire are respectively seated and closely confined when the several members of the structure are appropriately placed together and the annular tube B inflated. It will therefore be understood that the exact shape in cross-section of the rim A is unimportant so long as it is adapted to afford a bearing for the concave side of the annular tube B and is wide enough to afford room for containing the reinforced portions of the tire between the sides of the tube B and the inner faces of the flanges $a$ and $a'$, respectively.

It is preferred to make the reinforcing-ribs C' and C² integral with the edges of the tire, as shown in Fig. 1. The reinforcing-ribs may, however, be made integral with the sides of the annular tube B. For example, like the reinforcing-ribs E and E', (shown in Fig. 2,) or the reinforcing-ribs may consist of independent strips or annuli F and F', interposed between the sides of the annular tube B and the adjacent portions of the tire, as illustrated in Fig. 3. In either case it will be perceived that the undercut recesses are completely filled, so that no open space is left between the sides of the annular tube B and the inclosed portions of the tire, and hence the pneumatic pressure of the inflated tube B is so transmitted that the whole of the inclosed portions of the tire are firmly compressed, respectively, against the inner faces of the flanges.

What is claimed as the invention is—

1. The combination, as herein set forth, of a wheel-rim provided with an exterior groove and with convergent side flanges, an annular tube of flexible material seated in the said groove, an annular U-shaped rubber tire surrounding and embracing the convex portion of said tube, with its edges adapted to be seated in the undercut recesses afforded by the said inwardly-converging side flanges, and reinforcing-ribs for insuring the close confinement of the inclosed edges of the tire in the said recesses by the inflation of the said tube.

2. The combination, as and for the purposes herein set forth, of the wheel-rim A, provided with the inwardly-converging side flanges $a$ and $a'$, the annular tube B, and the annular tire C, constructed with the integral reinforcing-ribs $C'$ and $C^2$.

WM. E. BARTLETT.

Witnesses:
E. GATTERER,
M. L. ADAMS.